(12) United States Patent
Xie et al.

(10) Patent No.: US 8,378,887 B2
(45) Date of Patent: Feb. 19, 2013

(54) SYSTEMS AND METHODS FOR SYNTHESIZING GPS MEASUREMENTS TO IMPROVE GPS LOCATION AVAILABILITY

(75) Inventors: Gang Xie, Fullerton, CA (US); Makarand Shankar Phatak, Sunnyvale, CA (US); Mangesh Chansarkar, Irvine, CA (US); Anil Kumar Kandangath, Phoenix, AZ (US)

(73) Assignee: CSR Technology Inc., San Jose, CA (US)

( * ) Notice: Subject to any disclaimer, the term of this patent is extended or adjusted under 35 U.S.C. 154(b) by 0 days.

(21) Appl. No.: 13/439,075

(22) Filed: Apr. 4, 2012

(65) Prior Publication Data

US 2012/0188121 A1    Jul. 26, 2012

(51) Int. Cl.
  *G01S 19/47*    (2010.01)
  *G01S 19/38*    (2010.01)
(52) U.S. Cl. ............................. 342/357.3; 342/357.78
(58) Field of Classification Search ............... 342/357.3, 342/357.78, 357.23, 357.35
  See application file for complete search history.

(56) References Cited

U.S. PATENT DOCUMENTS

| | | | |
|---|---|---|---|
| 4,899,285 A | 2/1990 | Nakayama et al. |
| 5,430,657 A | 7/1995 | Kyrtsos |
| 5,502,641 A | 3/1996 | Isomura |
| 6,020,847 A | 2/2000 | Upton et al. |
| 6,181,275 B1 | 1/2001 | Chenebault et al. |
| 6,411,892 B1 | 6/2002 | Van Diggelen |
| 6,417,801 B1 | 7/2002 | Van Diggelen |
| 6,429,814 B1 | 8/2002 | Van Diggelen et al. |
| 6,453,237 B1 | 9/2002 | Fuchs et al. |
| 6,484,097 B2 | 11/2002 | Fuchs et al. |
| 6,487,499 B1 | 11/2002 | Fuchs et al. |
| 6,510,387 B2 | 1/2003 | Fuchs et al. |
| 6,542,820 B2 | 4/2003 | LaMance et al. |
| 6,560,534 B2 | 5/2003 | Abraham et al. |
| 6,606,346 B2 | 8/2003 | Abraham et al. |
| 6,618,006 B1 | 9/2003 | Syrjarinne |
| 6,704,651 B2 | 3/2004 | Van Diggelen |
| 7,248,964 B2 | 7/2007 | Bye |
| 2007/0109185 A1 | 5/2007 | Kracke et al. |

OTHER PUBLICATIONS

International Search Report and Written Opinion, dated Dec. 24, 2008.
Office Action for U.S. Appl. No. 11/934,832, filed Nov. 5, 2007, mailed Jul. 28, 2011.
Office Action for U.S. Appl. No. 11/934,832, filed Nov. 5, 2007, mailed Feb. 14, 2011.

*Primary Examiner* — Cassie Galt
(74) *Attorney, Agent, or Firm* — RatnerPrestia

(57) ABSTRACT

There are situations where GPS signals are received from less than four satellites. In order to improve the GPS location availability, disclosed here are systems and methods for synthesizing GPS measurements, which, together with fewer than four available real GPS signals, can be used to calculate a position fix. In particular, GPS range measurements for lost satellites, which are satellites that were previously tracked but are now not tracked, are synthesized to improve GPS signal availability. The synthesized measurements are used along with real measurements to enable accurate position fix even when GPS satellite availability is poor. Different synthesized measurement generation schemes, depending on whether an INS/DR aiding system is available, are further described herein.

20 Claims, 7 Drawing Sheets

SYSTEMS AND METHODS FOR SYNTHESIZING GPS MEASUREMENTS TO IMPROVE GPS LOCATION AVAILABILITY

CROSS REFERENCE TO RELATED APPLICATIONS

This application is a continuation of patent application Ser. No. 11/934,832, filed Nov. 5, 2007, entitled SYSTEMS AND METHODS FOR SYNTHESIZING GPS MEASUREMENTS TO IMPROVE GPS LOCATION AVAILABILITY, the contents of which are incorporated herein by reference.

TECHNICAL FIELD

The present disclosure is generally related to global positioning system (GPS) technology and, more particularly, is related to systems and methods for synthesizing GPS measurements to improve GPS location availability.

BACKGROUND

The Global Positioning System (GPS) is a satellite-based radio navigation system. In the GPS system, each GPS satellite, also called Space Vehicle (SV) broadcasts time-tagged ranging signals and navigation data. A GPS receiver tracks the satellites whose signals are within its field of view. From these visible satellites a GPS receiver extracts the navigation data and obtains range measurements from its received GPS satellite signals. The range measurements are used in a navigation solution to calculate a position fix of the GPS receiver.

The GPS navigation data contain, but are not limited to, satellite ephemeris, where ephemeris parameters can be used to accurately calculate satellite position and velocity. In addition to knowing the satellite position, the GPS receiver receives the range measurement to the satellite in order to calculate the position fix. Range measurements include, but are not limited to, two types of measurements—pseudorange (PR) and delta pseudo range (DPR).

A pseudorange is the apparent distance from the GPS receiver to the satellite. It is calculated by multiplying the speed of light by the apparent transit time, which is the time difference between a signal reception time based on a receiver clock and a signal transmission time based on a satellite clock. This range is termed pseudorange since the receiver clock is not synchronized with the satellite clock and thus the measured range is not necessarily the true range.

A second type of range measurement is the delta pseudo range (DPR), which in some receivers are reported in forms of carrier phase or Doppler frequency measurements. DPR is the measured pseudo range change rate. It is a function of a relative velocity, and a relative clock frequency drift between the satellite and the GPS receiver. The DPR measurement allows the receiver to calculate a receiver velocity and a receiver clock frequency drift, from which a new position fix can then be obtained if a previous position is known.

Pseudorange measurements associated with at least four satellites are typically used to obtain a position fix. This is because the receiver typically not only resolves its 3-D position, but also its clock bias since the receiver clock is not synchronized with the satellite clock. Four pseudorange measurements thus give four simultaneous equations enough information to calculate its 3-D position and clock bias. If only three pseudorange measurements are available, then the receiver can generally obtain a 2-D position fix by assuming the receiver's altitude is known. If less than three pseudorange measurements are available, then the receiver cannot compute the position fix.

Satellite ephemeredes are typically decoded from live signals before the navigation solution uses the pseudorange data to obtain a first position fix; however, it takes at least 18 seconds to collect a set of satellite clock and ephemeris parameters, and in some weak signal environments, correctly decoding ephemeredes is very difficult. Several solutions are available to reduce the time to first fix (TTFF). One such solution is the Assisted GPS (AGPS) technology which uses a GPS assistance server to assist the GPS receiver in obtaining the position fix. In one type of AGPS operation modes—Mobile Station assisted (MS-assisted), the GPS receiver sends the GPS measurement data wirelessly to the GPS server for the GPS server to calculate the receiver position. It is a solution, among others, to the Federal Communication Commission (FCC) Enhanced-911 (E911) requirement which mandates that the position of a cell phone to be available to emergency call dispatchers.

However, in the operation of the GPS receiver, there are many locations where the number of satellites available to the GPS receiver for measurement is less than four. Such situations arise in urban canyons, parking structures, tunnels, or other locations with significant signal blockage. In these situations the GPS server in an AGPS operation mode or the navigation solution in a stand-alone GPS receiver may not be able to obtain the position fix or may only obtain a very poor fix.

SUMMARY

There are situations where the GPS signals are received from less than four satellites. In order to improve the GPS location availability, disclosed here are systems and methods for synthesizing GPS measurements, which, together with fewer than four available real GPS measurements, can be used to calculate a position fix. In particular, GPS range measurements for lost satellites, which are satellites that were previously tracked but are now not visible, are synthesized to improve GPS signal availability. The synthesized measurements are used along with real measurements to enable a more accurate position fix even when GPS satellite visibility and geometry were originally poor. Different synthesized measurement generation schemes, depending on whether an INS/DR aiding system is available, are further described herein.

GPS range measurements can be synthesized for stand-alone GPS receivers that do not have any external aiding sensors or systems or for GPS receivers where the external sensors or systems do not deliver any valid outputs. Alternatively or additionally, the GPS range measurements can be synthesized for GPS receivers where external sensors such as inertial navigation system (INS) sensors or automobile dead reckoning (DR) systems are available to deliver valid outputs.

Other systems, methods, features of the invention will be or will become apparent to one skilled in the art upon examination of the following figures and detailed description. It is intended that all such systems, methods, features be included within the scope of the invention, and be protected by the accompanying claims.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which GPS measurements are synthesized.

Figure 1:
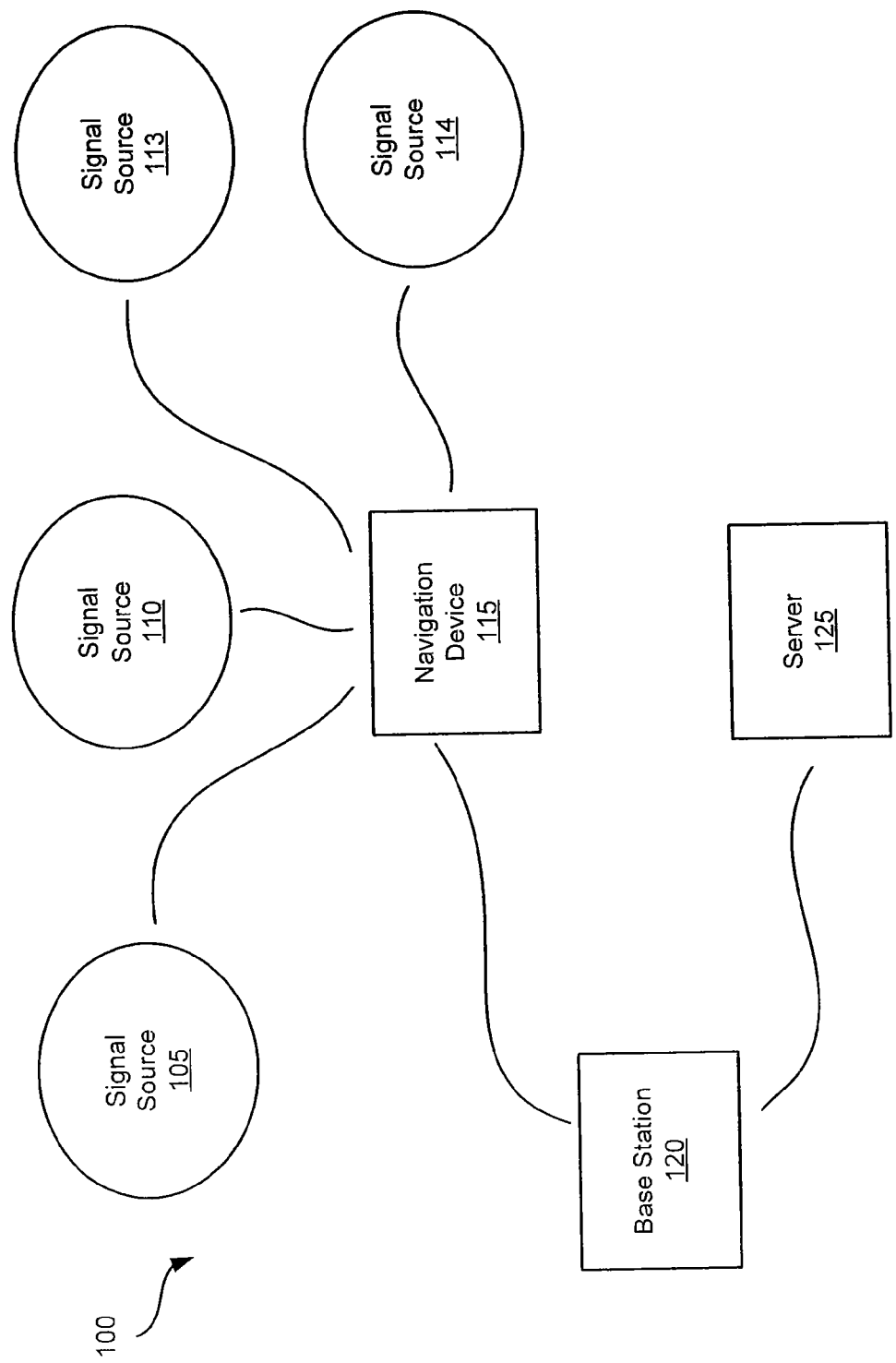
FIG. 1 is a block diagram that illustrates a system for synthesizing GPS measurements.

FIG. 1 is a block diagram that illustrates a system 100 for synthesizing GPS measurements. A simple system 100 comprises a plurality of signal sources 105, 110, 113, 114 and a navigation device 115. Alternatively or additionally, a more complex system 100, such as an assisted global positioning system (AGPS), further comprises a base station 120 and a server 125. Although only one navigation device 115, one base station 120, and one server 125 are shown in system 100, the system 100 can include multiple navigation devices, multiple base stations and/or multiple servers. Alternatively or additionally, the server 125 may be co-located with the base station 120 or with the navigation device 115.

The signal sources 105, 110, 113, 114 include GPS satellites (also known as space vehicles), among others. The signal sources 105, 110, 113, 114 generally orbit above the location of the navigation devices 115 at any given time. The navigation devices 115 include, but are not limited to, GPS receivers, cell phones with embedded signal receivers, and personal digital assistants (PDAs) with embedded signal receivers, among others. The signal sources 105, 110, 113, 114 transmit signals to the navigation devices 115, which use the signals to determine the location, speed, and direction of the navigation devices 115.

In an AGPS system, a GPS assistance server 125 assists the navigation devices 115, such as a Mobile Station (MS) client (e.g., a cellular phone) in obtaining a position fix on the client's position. In one embodiment of the AGPS, the MS client 115 sends GPS measurements to the GPS server 125, which then calculates the client's position. For an accurate 3-D position fix the MS client 115 generally receives signals from four satellites 105, 110, 113, 114. However, signal blockage due to the mobile environment in which the client operates may prevent visibility to four satellites 105, 110, 113, 114. For example, as a mobile client 115 moves through the urban canyon, satellites 105, 110, 113, 114 may drop out of view, and conversely other satellites 105, 110, 113, 114 may come into view. If the GPS measurements to the lost satellites can be synthesized during the time interval when less than four satellites are visible, then the navigation device 115 and/or the GPS server can calculate the 3-D position fix.

Figure 2:
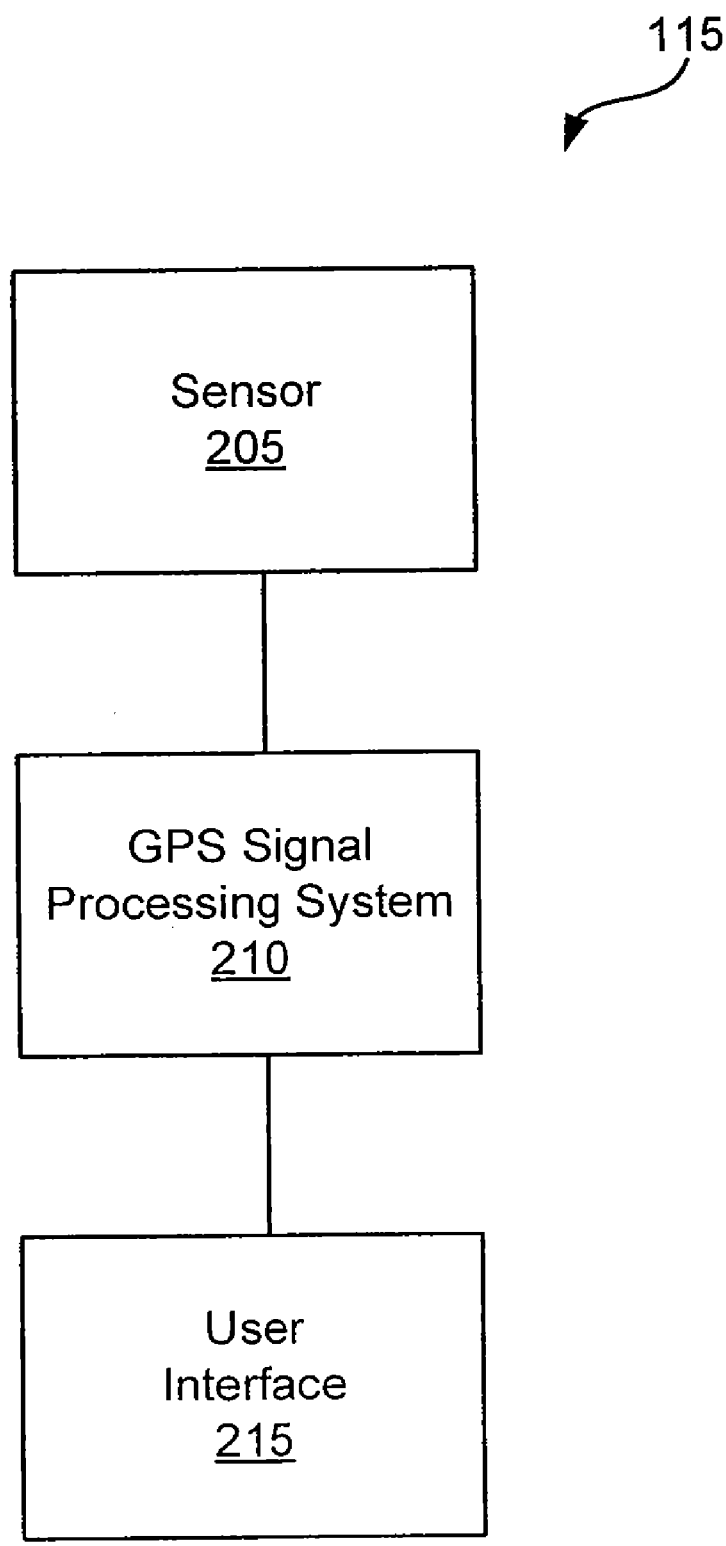
FIG. 2 is a block diagram that illustrates an embodiment of a navigation device 115, such as that shown in FIG. 1.

FIG. 2 is a block diagram that illustrates an embodiment of the navigation device 115, such as that shown in FIG. 1. The navigation device 115 includes, but is not limited to, sensor(s) 205, a GPS signal processing system 210, and a user interface 215. It should be noted that the sensor 205 may not be included in some navigation devices 115. The sensor 205 can include, but is not limited to, inertial sensors that include, for example, micro-electromechanical system (MEMS) sensors, such as, for example, accelerometers and gyroscopes, among others. In general, accelerometers measure acceleration of their own motion. The accelerometer detects specific force which includes gravity and vehicle acceleration.

In general, an inertial navigation system (INS) has accelerometers and gyroscopes accelerometers mounted on multiple axes of a carrier vehicle. The accelerometers measure the vehicle acceleration and the gyroscopes measure orientation or angular change rate. In general, the sensor 205 can detect the difference between the moving and stationary vibrations of a vehicle. In particular, the sensor 205 can detect the acceleration and/or the angular change rate of the vehicle and generate a vehicle vibration profile based on the detected acceleration and/or the detected angular change rate. Based on the sensor measurements, the INS can calculate the traveled distance and direction change through integration.

INS is one kind of dead reckoning (DR) systems. Besides the INS, another DR system is, e.g., differential wheel speed sensor method, in which the distance traveled and the heading change can be derived based on one or two pairs of left and right wheel sensors. In general, dead reckoning refers to a process of calculating location by integrating measured increments of distance and direction of travel relative to a known location.

The GPS signal processing system 210 can include, but is not limited to, a GPS receiver, among others. Not only is the GPS receiver capable of computing position fixes by itself without sensors 205, but it can also be integrated with the INS/DR. The INS/DR and GPS can be integrated in a loose, tight or deep way. The integrated system can not only eliminate the error growth problem of an INS/DR but also overcome lots of difficulties faced by the GPS receiver in, for example, urban canyon environments.

Figure 3:
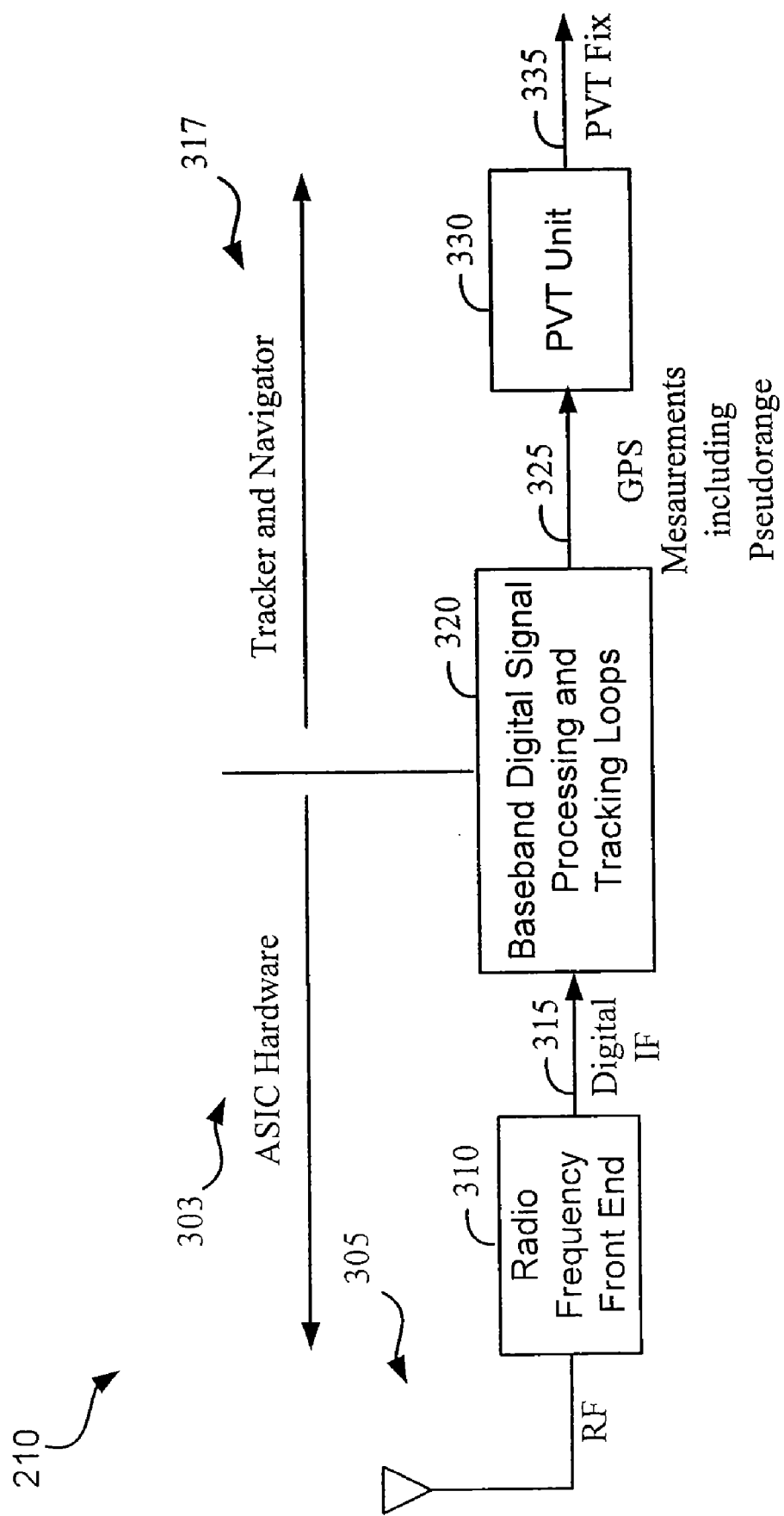
FIG. 3 is a block diagram that illustrates an embodiment of a GPS signal processing system, such as that shown in FIG. 2, which synthesizes GPS measurements.

FIG. 3 is a block diagram that illustrates an embodiment of the GPS signal processing system, such as that shown in FIG. 2, which synthesizes GPS measurements. The GPS signal processing system 210 can include, but is not limited to, an antenna 305, an application-specific integration circuit (ASIC) hardware 303 and a tracker and navigator 317. The ASIC hardware 303 includes a radio frequency (RF) front end 310 and a baseband digital signal processing (DSP) 320. The navigation tracker and navigator 317 includes, but is not limited to, a position, velocity, and time (PVT) unit 330 and tracking loops unit 320 that controls the DSP. The tracker and navigator 317 can be, for example, in a form of software running inside a microprocessor, among others.

The antenna 305 receives GPS signals for visible satellites, and sends the received signals to the RF front end unit 310 that down-converts, magnifies, filters, and digitizes the received signals into digital immediate frequency (IF) signals 315. Such digital IF signals 315 are input to the baseband DSP unit 320 that acquires and tracks the received signals and then generates pseudorange measurements 325 according to the received GPS signals. In one embodiment, the baseband DSP 320 includes a carrier tracking loop (not shown) that computes an estimated DPR and a code tracking loop (not shown) that computes an estimated PR.

The baseband DSP unit 320 delivers the generated pseudorange measurements 325 to the PVT unit 330 that computes a GPS solution or position fix 335 based on the generated pseudorange measurements 325 with or without the aid of an external aiding sensor or system. The PVT unit 330 includes, but is not limited to, a navigation algorithm (not shown), among others, which can include, but is not limited to, a Least-Square (LS) or Kalman filtering, among others. It should be noted that in an AGPS system, the server 125 receives the GPS measurements from the navigation devices 115 and calculates a position fix on the receiver's position.

When signal blockage occurs in an urban environment, the RF signal may be impaired where the baseband DSP 320 is unable to track the signal sources 105, 110, 113, 114 (FIG. 1) and then fail to generate the GPS range measurements for the signal sources 105, 110, 113, 114. Accordingly, GPS range measurements can be synthesized at, for example, the baseband DSP 320, PVT Unit 330, or a stand alone GPS measurement synthesis unit (not shown) between the baseband DSP 320 and PVT Unit 330, among others. Operations for synthesizing GPS range measurements are described in relation to FIGS. 4 and 5.

Figure 4:
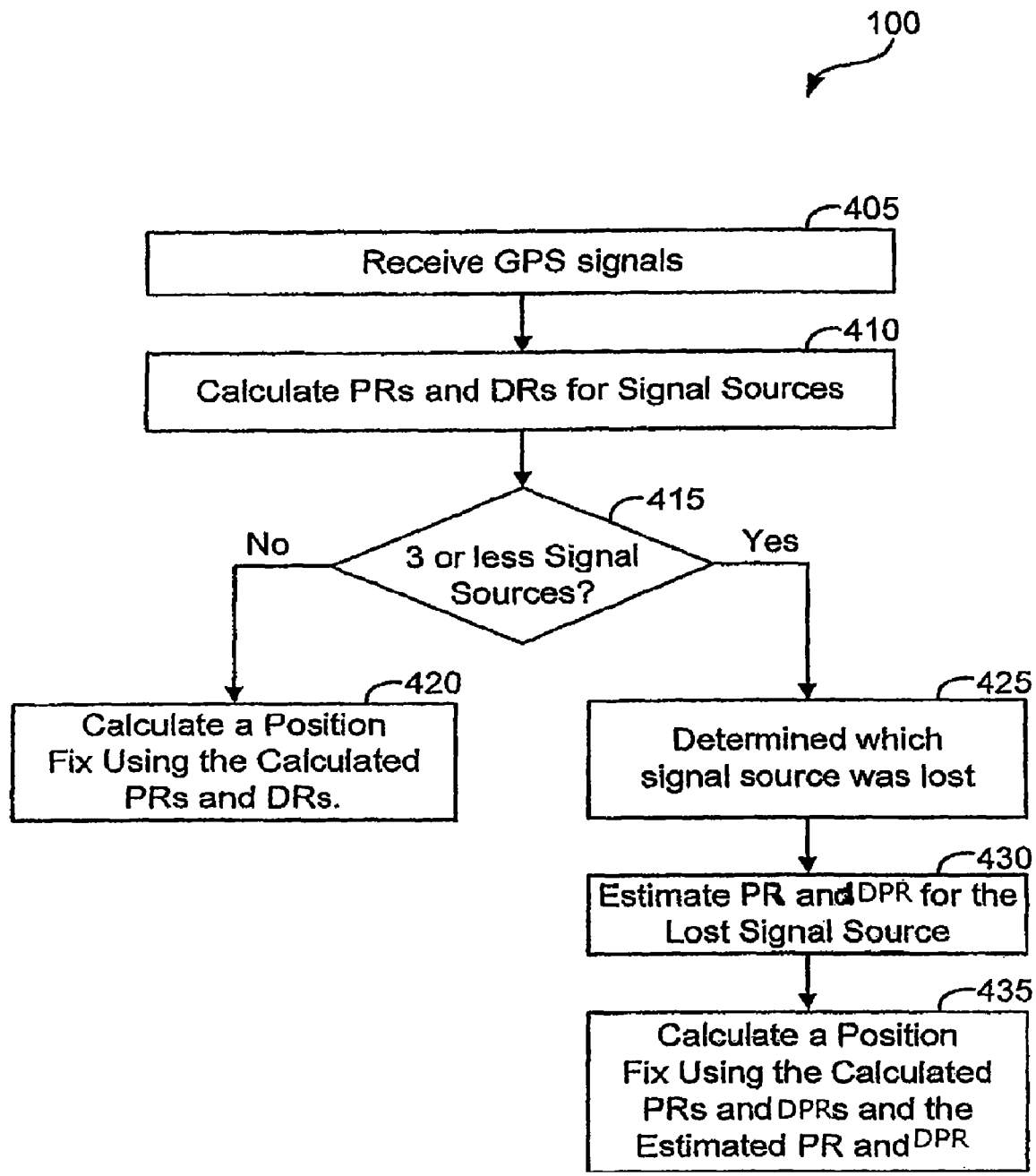
FIG. 4 is a flow diagram that illustrates an embodiment of the architecture, functionality, and/or operation of the system, such as that shown in FIG. 1, which synthesizes pseudo-range (PR) and delta pseudo range (DPR)

FIG. 4 is a flow diagram that illustrates an embodiment of the architecture, functionality, and/or operation of the system, such as that shown in FIG. 1, which synthesizes pseudorange (PR) and delta pseudo range (DPR). Beginning with steps 405 and 410, a navigation device 115 (FIG. 1) receives GPS signals from signal sources 105, 110, 113, 114 (FIG. 1) and calculates the pseudoranges and delta pseudo ranges associated with the GPS signals from the signal sources 105, 110, 113, 114, respectively. It should be noted that calculated PRs and DPRs and previous PRs and DPRs are stored in memory (not shown) in the navigation device 115.

In step 415, the navigation device 115 determines whether the navigation device 115 receives three (3) or less signal sources. If the navigation device 115 receives GPS signals from at least four signal sources, the navigation device 115, in step 420, calculates the PRs and DPRs associated with the GPS signals from the at least four signal sources. In step 420, the navigation device 115 and/or the server 125 calculates a position fix using the calculated PRs and DPRs.

If the navigation device 115 receives the GPS signals from three or less signal sources, the navigation device 115, in step 425, determines which signal source(s) was lost or became untracked. In step 430, the navigation device 115 estimates pseudorange and delta pseudo range for each lost signal source based on the received GPS signals. In step 435, the navigation device 115 and/or server 125 calculates a position fix using the calculated pseudoranges and delta pseudo ranges as well as the estimated pseudorange and delta pseudo range in a navigation solution.

Figure 5:
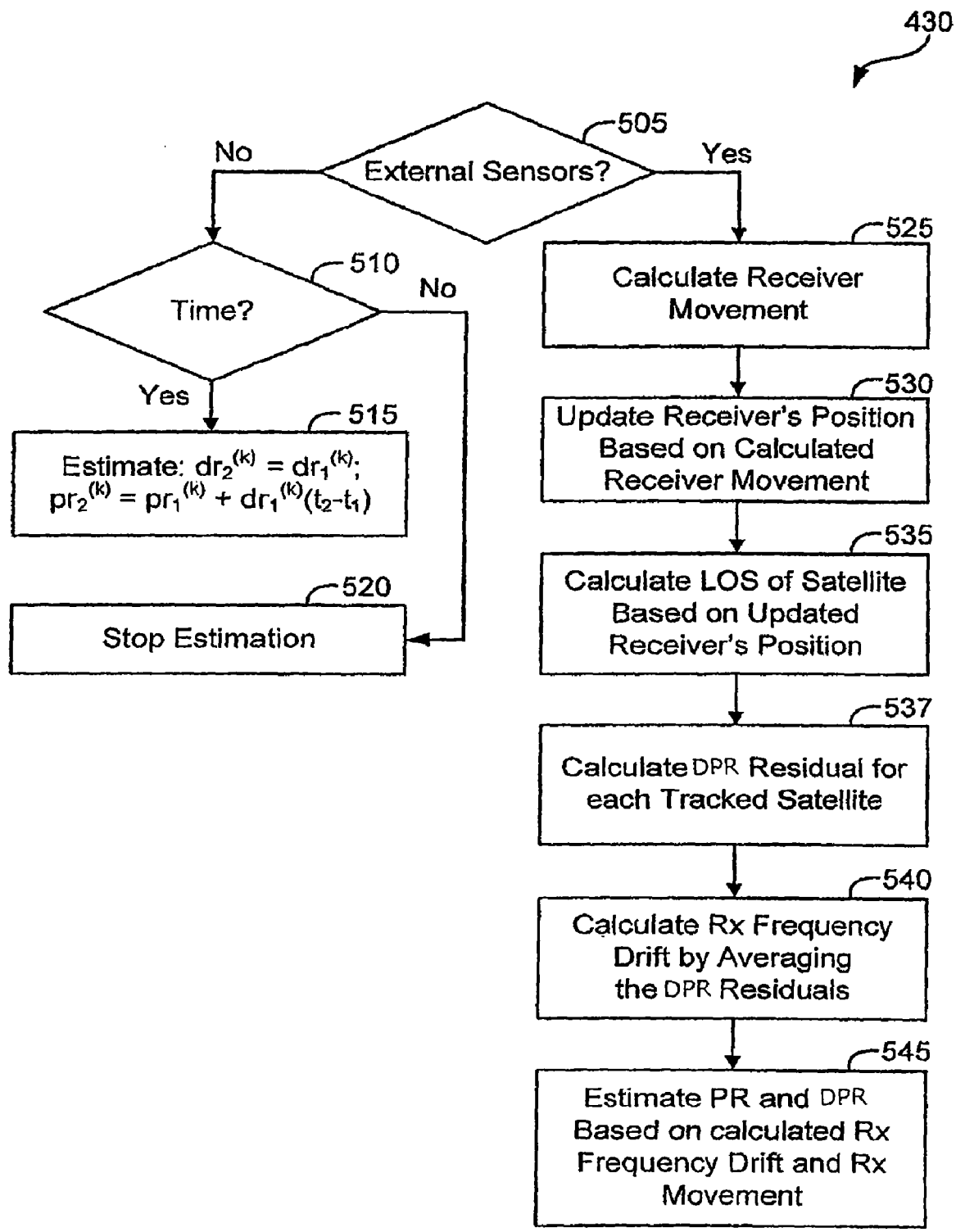
FIG. 5 is a flow diagram that illustrates an embodiment of the architecture, functionality, and/or operation for estimating PR and DPR, such as that shown in step 430 of FIG. 4.

FIG. 5 is a flow diagram that illustrates an embodiment of the architecture, functionality, and/or operation for estimating pseudorange (PR) and delta pseudo range (DPR) for signal sources 105, 110, 113, 114 (FIG. 1) that are temporarily invisible or lost, such as that shown in step 430 of FIG. 4. Beginning with step 505, the navigation device 115 determines whether the navigation device 115 has external aiding sensors or systems 205 (FIG. 2), or the navigation device 115 receives GPS information associated with the external aiding sensors or systems 205.

The navigation device 115 has a time counter for each satellite, which records the time when the satellite was last tracked. This recorded time cannot be too long from the current time, $t_2$, the difference of which are compared with the time threshold. In step 510, if the navigation device 115 does not utilize external aiding sensors or systems 205, the navigation device 115 determines whether the difference between the recorded time and the time, $t_2$, associated with estimating the PR and DPR passed (e.g., is less than) a time threshold. The DPR is assumed to stay relatively constant over a short time interval; thus, the time threshold includes several seconds in any case and up to a minute for high-elevation satellites if the navigation device 115 is static or moves with a nearly constant speed.

The time, $t_1$, generally refers to the last time when the PR and DPR measurements, either real or synthesized, are valid. Once a measurement is received or synthesized at time, $t_2$, it immediately becomes time, $t_1$, for next epoch. Accordingly, $t_2 - t_1$ is usually very close to 1 second (but not exactly 1 second).

Generally, the DPR is a function of the relative velocity between the signal source 105, 110, 113, 114 (FIG. 1) and the receiver 210 (FIG. 2) projected along the line of sight, the clock frequency drift of the signal source 105, 110, 113, 114, and the receiver's clock frequency drift. It is expressed by $$dr^{(k)} = \vec{v}^{(k)} - \vec{v}_{rx} \cdot \vec{1}^{(k)} + \delta f_{rx} - \delta f^{(k)} \quad \text{(Eq. 1)}$$

where $dr^{(k)}$ refers to the DPR of a satellite 105, 110, 113, 114, $\vec{v}^{(k)}$ refers to the satellite velocity, $\vec{v}_{rx}$ refers to the receiver velocity, $\vec{1}^{(k)}$ refers to the line of sight unit vector from the receiver 210 to the satellite 105, 110, 113, 114, $\delta f_{rx}$ refers to the receiver frequency drift, and $\delta f^{(k)}$ refers to the satellite clock frequency drift.

The receiver 210 is assumed to have a constant velocity motion relative to the satellite 105, 110, 113, 114. Since the satellite velocity $\vec{v}^{(k)}$, about 3 kilometers per second, is much larger than the receiver velocity $\vec{v}_{rx}$, the smooth motion of the satellite 105, 110, 113, 114 and its line of trajectory largely determine the relative velocity between the satellite 105, 110, 113, 114 and the receiver 210. Within a short time interval, it is reasonable to assume that the satellite 105, 110, 113, 114 moves with a constant velocity projected on the line of sight. Therefore, $(\vec{v}^{(k)} - \vec{v}_{rx}) \cdot \vec{1}^{(k)}$ is generally constant for a short duration of up to 5 seconds for land vehicle navigation and longer than 5 seconds for a receiver that is static or moves with a constant speed. The $\delta f_{rx}$ and $\delta f^{(k)}$ are also reasonably assumed to be stable for this brief duration.

The relationship between PR and DPR is expressed by $$pr_2^{(k)} - pr_1^{(k)} \approx (t_2 - t_1) \times dr_2^{(k)} \quad \text{(Eq. 2)}$$

where $pr_1^{(k)}$ and $pr_2^{(k)}$ are the noise-free pseudorange measurements for the same satellite 105, 110, 113, 114 delivered by a GPS receiver 210 at $t_1$ and $t_2$, respectively, and $dr_2^{(k)}$ is the corresponding noise-free DPR measurement at $t_2$. An approximation equality used in the above formula is due to the code/carrier phase ionospheric divergence, among others. For example, the ionospheric delay makes PR measurements longer while the DPR measurements shorter.

If the time difference from step 510 is not small enough or the user dynamic is not constant, then in step 520 the navigation device 115 and/or the server 125 stops estimation of the PR and DPR. In step 515, since DPR measures the pseudorange change rate and if DPR is assumed to be constant over a brief duration and if the receiver 210 loses the tracking of the satellite 105, 110, 113, 114 at $t_2$, the receiver 210 can synthesize the kth satellite's $pr_2^{(k)}$ and $dr_2^{(k)}$ as:

$$dr_2^{(k)} = dr_1^{(k)} \quad \text{(Eq. 3)}$$

$$pr_2^{(k)} = pr_1^{(k)} + dr_1^{(k)}(t_2 - t_1) \quad \text{(Eq. 4)}$$

If the receiver 210 receives the GPS information associated with the external aiding sensors or systems 205, the navigation device 115 and/or server 125 can synthesize GPS measurements using the GPS information from the external aiding sensors 205, such as inertial navigation systems (INS) or automobile ABS dead reckoning (DR) system. The sensors 205 can further include, but are not limited to, Cell ID, Timing Access (TA), Round Trip Time (RTT), Angle of Arrival (AoA), signal strength; with the aid of system such as wireless network of 802.11, Bluetooth; or with other hybrid technology, and other Global Satellite Navigation System (GNSS) signals, such as Galileo and GLONASS. In general, if the position, velocity and clock can be computed or maintained with the help of any external aiding sensors or systems, GPS measurements for temporarily invisible satellites can be synthesized.

The INS and DR sensors 205 generally deliver two pieces of information about the motion of the navigation device 115, such as, for example, the distance traveled and the heading change during a certain period of time. Alternatively or additionally, an INS/DR system 205 delivers velocity information in each axis of a coordinate system, either a 3D or 2D, depending on the number of sensors. For example, for landing vehicle navigation, two accelerometers can be mounted and can deliver a 2D velocity information in a horizontal plane. The vertical velocity is assumed to be zero.

In another example, if three accelerometers on three perpendicular axes are mounted, then the accelerometers can deliver 3D velocity information. Given a 3D velocity $\vec{v}_{rx}$ and available GPS measurements, in step 525, the receiver movement is calculated as $(t_2-t_1) \times \vec{v}_{rx}$ based on the receiver velocity $\vec{v}_{rx}$ from the external aiding sensors 205. In step 530, given the receiver's position $\vec{x}_1$ at $t_1$, the navigation device 115 can update the receiver's position $\vec{x}_2$ at time $t_2$ based on the calculated receiver movement.

$$\vec{x}_2 = \vec{x}_1 (t_2-t_1) \vec{v}_{rx} \quad \text{(Eq. 5)}$$

In step 535, based on the updated receiver position $\vec{x}_2$, and the satellite position for each available satellite from the ephemeris, the line of sight vector $\vec{1}$ to each available satellite (e.g., satellite k) can be calculated. In step 537, the DPR measurement residual is calculated for each tracked or visible satellite k as well as $\vec{v}_{rx}$ from the external aiding sensors 205, the actual DPR measurement from the carrier tracking loop, satellite velocity $\vec{v}^{(k)}$ and satellite clock frequency drift $\delta f^{(k)}$ from the ephemeris based on the calculated line of sight vector $\vec{1}^{(k)}$ as follows:

$$\delta f^{(k)} = dr^{(k)} - (\vec{v}^{(k)} - \vec{v}_{rx}) \cdot \vec{1}^{(k)} + \delta f^{(k)} \quad \text{(Eq. 6)}$$

In step 540, the average of the DPR measurement residuals for all the tracked satellites is regarded as the receiver frequency drift $\delta f_{rx}$ and is calculated as follows:

$$\delta f_{rx} = \frac{1}{N} \sum_{k=1}^{N} \delta f^{(k)} \quad \text{(Eq. 7)}$$

where k from 1 to N denotes all the tracked satellites.

In step 545, after obtaining the estimates of the receiver velocity $\vec{v}_{rx}$ from the external aiding sensors 205, and frequency drift $\delta f_{rx}$ at $t_2$, the navigation 115 synthesizes GPS measurements for lost satellites from equation (1) and equation (2) as follows:

$$dr_2^{(k)} = (\vec{v}^{(k)} - \vec{v}_{rx}) \cdot \vec{1}^{(k)} - \delta f^{(k)} + \delta f_{rx} \quad \text{(Eq. 8)}$$

$$pr_2^{(k)} = pr_1^{(k)} + dr_2^{(k)} \cdot (t_2 - t_1) \quad \text{(Eq. 9)}$$

where index k is from N+1 to M, and these satellites were previously tracked but lost at $t_2$. For each non-tracked satellite k, satellite velocity $\vec{v}^{(k)}$, satellite clock frequency drift $\delta f^{(k)}$ and the line of sight unit vector $\vec{1}^{(k)}$ from the receiver to the lost satellite at $t_2$ can be easily calculated even though the satellite is not tracked at $t_2$.

Since the external aiding sensors measurements reflect the actual dynamics of the receiver 210, the navigation device 115 does not need to assume any user dynamic motion model to synthesize the GPS measurements. The navigation device 115 having the external aiding sensors 205 can not only synthesize both PR and DPR measurements, but can also synthesize measurements for lost satellites for a longer duration. Simulations and experiments showed that the navigation device 115 having the external aiding sensors 205 synthesizes accurate GPS measurements for satellites even after an approximately 60-second outage, for example. Generally, the accuracy of such synthesized GPS measurements and the valid duration for synthesizing the GPS measurements depend on the accuracy of the external aiding sensors 205 and their error accumulation nature. It should be noted that the navigation device 115 having the external aiding sensors 205 generally includes an initial receiver position at previous time of $t_1$. If the navigation device 115 does not have the initial receiver position, the navigation device 115 can calculate the initial receiver position using steps 510 to 520, which assumes that the navigation device 115 does not have external aiding sensors.

Though the process in step 430 is intended to improve AGPS location availability, the process in step 430 can also be used to improve the availability of stand-alone GPS receivers. For example, the use of steps 525 to 545 to update the average receiver clock frequency drift $\delta f_{rx}$, and to update the DPR and PR for the lost satellite can be used to initialize Kalman filter earlier in a standalone GPS navigation solution. Alternatively or additionally, steps 510 to 520 can be used to obtain 3D Least Squares position fix more quickly in AGPS mode.

Figure 6:
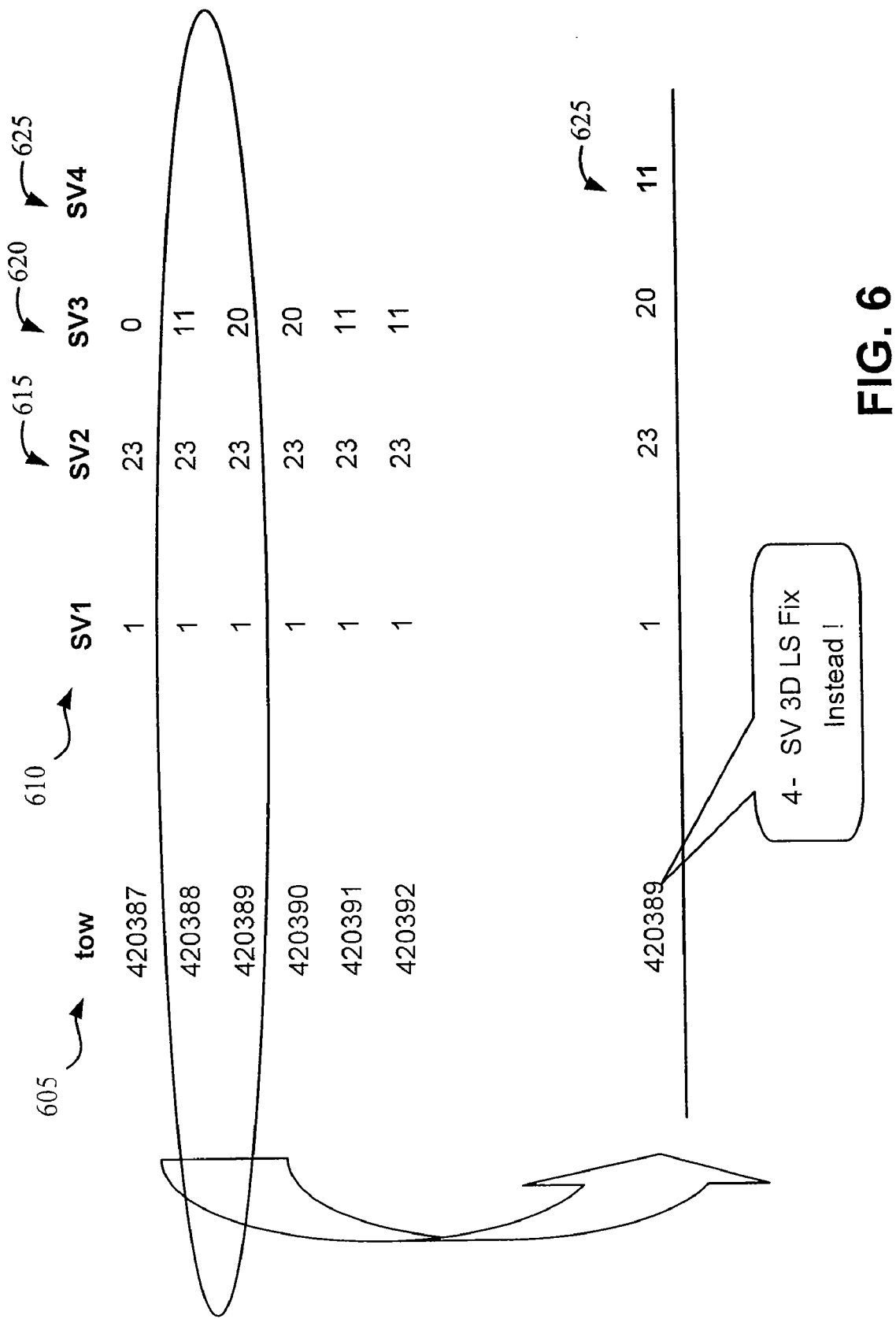
FIG. 6 is a diagram that illustrates a GPS signal availability scenario that generally occurs in urban canyon environments.

FIG. 6 is a diagram that illustrates a GPS signal availability scenario that generally occurs in urban canyon environments. The GPS signals are tracked according to time of week (TOW) GPS time 605, which is generated based on a combination of the current Week Number and the time of week. The TOW refers to the number of seconds into the week ranging from 0 second to 604800 seconds and is counted from midnight Saturday/Sunday on the GPS time scale.

In this example, during the six seconds from 420387 seconds to 420392 seconds, there were only three or even two space vehicle measurements available at certain seconds. The GPS signals associated with space vehicles 1 and 23 are available as first and second sets 610, 615 of space vehicle measurements. However, a third set 620 of space vehicle measurement is available from both space vehicles 11 and 20. There are no available GPS signals for a fourth set 620 of space vehicle measurement. Although losing track of space vehicle 11, the navigation device 115 tracked a new space vehicle, e.g., space vehicle 20, from 420388 seconds to 420389 seconds. Based on the space vehicle 11 measurements at 420388 seconds, the navigation device 115 can synthesize measurements 625 for space vehicle 11, for example, at 420389 seconds. Together with the synthesized measurements of space vehicle 11, a total of four satellite measurements is available where the navigation device 115 and/or the server 125 can calculate a 3D position fix at 420389 seconds.

Figure 7:
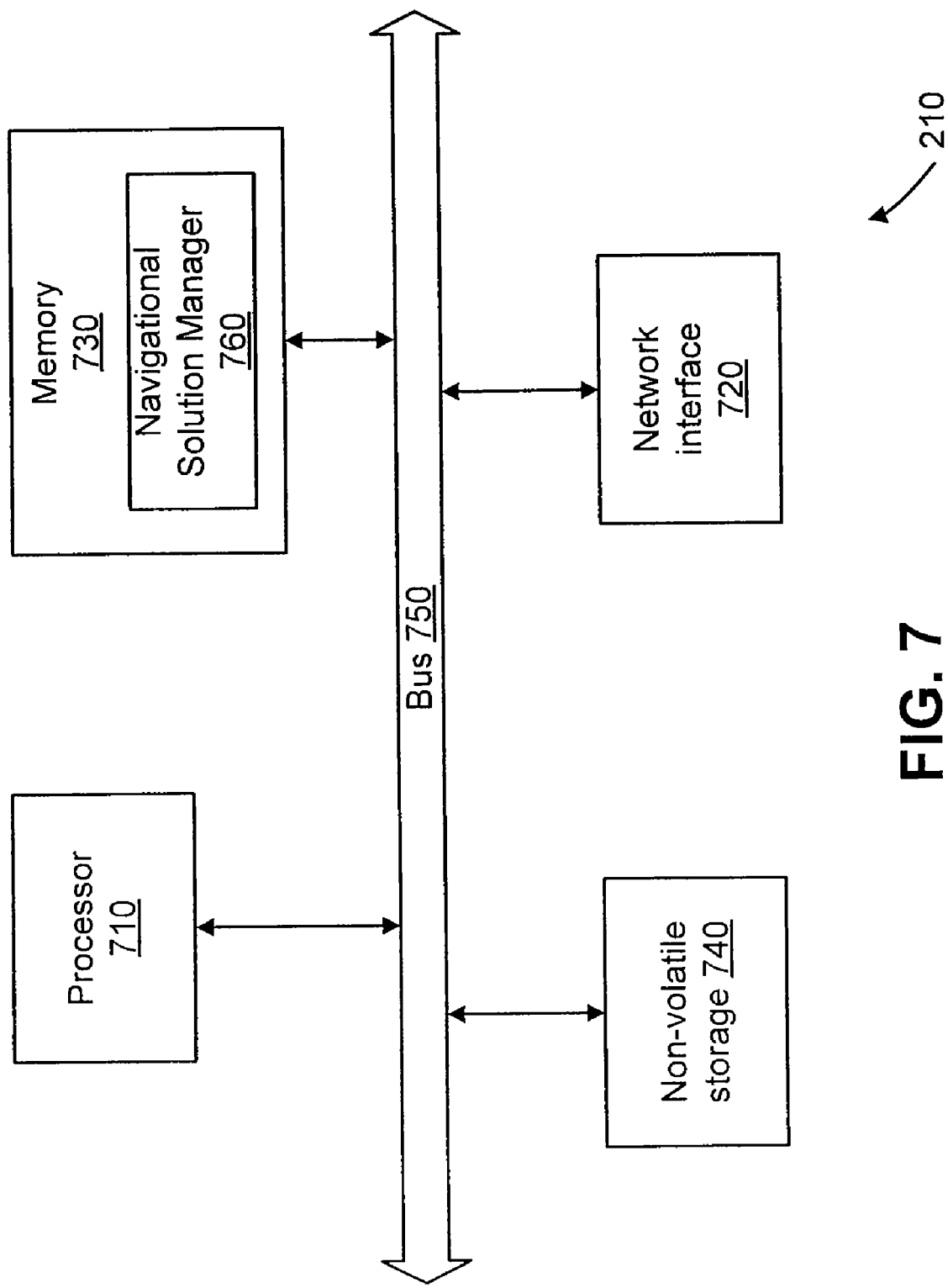
FIG. 7 is a block diagram that illustrates an embodiment of a GPS signal process system 210, such as that shown in FIGS. 2 and 3.

FIG. 7 is a block diagram that illustrates an embodiment of the GPS signal process system 210, such as that shown in FIGS. 2 and 3. The GPS signal process system 210 includes a processor 710, a network interface 720, memory 730, and non-volatile storage 740. Examples of non-volatile storage include, for example, a hard disk, flash RAM, flash ROM, EEPROM, etc. These components are coupled via a bus 750. The memory 730 includes a navigational solution manager 760 that facilitates synthesizing GPS measurements and processing a navigational solution based on the synthesized GPS measurements. Operations of the navigational manager 760 can be described in detail in relation to FIGS. 4 and 5. The memory 730 contains instructions which, when executed by the processor 710, implement at least a portion of the methods and systems disclosed herein, particularly the navigational solution manager 760. Omitted from FIG. 7 are a number of conventional components, known to those skilled in the art that are unnecessary to explain the operation of the device 210.

The systems and methods disclosed herein can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, at least the following is claimed:

1. A method for synthesizing global navigation satellite system (GNSS) measurements, the method comprising:
receiving, by a navigation device, a GNSS signal from a signal source;
calculating pseudoranges (PRs) and delta pseudo ranges (DPRs) associated with the GNSS signal;
identifying the signal source as a lost signal source when the GNSS signal is not being received;
estimating PRs and DPRs for the lost signal source based on previously calculated PRs and DPRs of the lost signal source;
determining a position of the navigation device using dead reckoning;
determining a validity of the estimated PRs and DPRs based on the dead reckoning; and
calculating a position fix using the calculated PRs and DPRs, and the estimated PRs and DPRs in a navigation solution based on the determined validity of the estimated PRs and DPRs.

2. The method of claim 1, including
determining the validity of the estimated PRs and DPRs by comparing an elapsed time since the estimated PRs and DPRs were estimated to a predetermined time duration determined based on an accuracy of the dead reckoning.

3. The method of claim 1, including
determining the position of the navigation device using at least one dead reckoning sensor coupled to a vehicle in which the navigation device is installed, the at least one sensor tracking the position of the navigation device as the vehicle travels.

4. The method of claim 3, including
determining the validity of the estimates based on an accuracy of the at least one sensor used in the dead reckoning.

5. The method of claim 1, including
determining the position of the navigation device using the dead reckoning beginning from a previously known position fix of the navigation device.

6. The method of claim 1, including
determining the position of the navigation device using an inertial navigation system (INS) for dead reckoning, the INS including accelerometers and gyroscopes coupled to a vehicle in which the navigation device is installed.

7. The method of claim 1, including
determining the position of the navigation device using a differential wheel speed system (DWSS) for dead reckoning, the DWSS including wheel speed sensors coupled to at least two wheels of a vehicle in which the navigation device is installed.

8. A global navigation satellite system (GNSS) receiver comprising:
an antenna configured to receive a GNSS signal from a signal source; and
a baseband processor configured to:
calculate pseudoranges (PRs) and delta pseudo ranges (DPRs) associated with the GNSS signal,
identify the signal source as a lost signal source when the GNSS signal is not being received,
estimate PRs and DPRs for the lost signal source based on previously calculated PRs and DPRs of the lost signal source,
determine a position of the navigation device using dead reckoning,
determine a validity of the estimated PRs and DPRs based on the dead reckoning, and
calculate a position fix using the calculated PRs and DPRs, and the estimated PRs and DPRs in a navigation solution based on the determined validity of the estimated PRs and DPRs.

9. The GNSS receiver of claim 8,
wherein the baseband processor is configured to determine the validity of the estimated PRs and DPRs by comparing an elapsed time since the estimated PRs and DPRs were estimated to a predetermined time duration determined based on an accuracy of the dead reckoning.

10. The GNSS receiver of claim 8, including
at least one dead reckoning sensor coupled to a vehicle in which the navigation device is installed, the at least one dead reckoning sensor tracking the position of the navigation device as the vehicle travels during dead reckoning.

11. The GNSS receiver of claim 10,
wherein the baseband processor is configured to determine the validity of the estimates based on an accuracy of the at least one dead reckoning sensor.

12. The GNSS receiver of claim 8,
wherein the baseband processor is configured to determine the position of the navigation device using the dead reckoning beginning from a previously known position fix of the navigation device.

13. The GNSS receiver of claim 8, further including
an inertial navigation system (INS),
wherein the baseband processor is configured to determine the position of the navigation device using the INS for dead reckoning, the INS including accelerometers and gyroscopes coupled to a vehicle in which the navigation device is installed.

14. The GNSS receiver of claim 8, further including
a differential wheel speed system (DWSS),
wherein the baseband processor is configured to determine the position of the navigation device using the DWSS for dead reckoning, the DWSS including wheel speed sensors coupled to at least two wheels of a vehicle in which the navigation device is installed.

15. A system for synthesizing global navigation satellite system (GNSS) measurements comprising:
a GNSS receiver configured to:
receive a GNSS signal,
calculate pseudoranges (PRs) and delta pseudo ranges (DPRs) associated with the GNSS signal,
identify the signal source as a lost signal source when the GNSS signal is not being received,
estimate PRs and DPRs for the lost signal source based on previously calculated PRs and DPRs of the lost signal source,
determine a position of the GNSS receiver using dead reckoning; and
an aiding server configured to:
receive the PRs and DPRs and the estimated PRs and DPRs from the GNSS receiver,
determine a validity of the estimated PRs and DPRs based on the dead reckoning,
calculate a position fix using the calculated PRs and DPRs, and the estimated PRs and DPRs in a navigation solution based on the determined validity of the estimated PRs and DPRs, and
transmit the position fix to the GNSS receiver.

16. The system of claim 15,
wherein the aiding server is configured to determine the validity of the estimates by comparing an elapsed time since the estimated PRs and DPRs were estimated to a predetermined time duration determined based on an accuracy of the dead reckoning.

17. The system of claim 15, including
at least one dead reckoning sensor coupled to a vehicle in which the GNSS receiver is installed, the at least one sensor tracking the position of the GNSS receiver as the vehicle travels using dead reckoning,
wherein the GNSS receiver is configured to determine the validity of the estimates based on an accuracy of the at least one sensor used in the dead reckoning.

18. The system of claim 15,
wherein the GNSS receiver is configured to determine the position of the GNSS receiver using the dead reckoning beginning from a previously known position fix of the GNSS receiver.

19. The system of claim 15, further including
an inertial navigation system (INS),
wherein the GNSS receiver is configured to determine the position of the GNSS receiver using the INS for dead reckoning, the INS including accelerometers and gyroscopes coupled to a vehicle in which the GNSS receiver is installed.

20. The system of claim 15, further including
a differential wheel speed system (DWSS),
wherein the GNSS receiver is configured to determine the position of the navigation device using the DWSS for dead reckoning, the DWSS including wheel speed sensors coupled to at least two wheels of a vehicle in which the GNSS receiver is installed.

* * * * *